United States Patent [19]

Yada et al.

[11] Patent Number: 4,601,872
[45] Date of Patent: Jul. 22, 1986

[54] WATER SEALING DEVICE FOR USE IN REPLACING CONTROL ROD DRIVE HOUSING

[75] Inventors: Yoshio Yada; Yasumasa Tamai, both of Hitachi; Tsugio Iwama, Mito, all of Japan

[73] Assignee: Hitachi, Ltd., Tokyo, Japan

[21] Appl. No.: 600,905

[22] Filed: Apr. 16, 1984

[30] Foreign Application Priority Data

Apr. 15, 1983 [JP] Japan .................................. 58-66764

[51] Int. Cl.4 ........................ G21C 17/00; G21C 19/20
[52] U.S. Cl. ......................................... 376/248; 277/3;
277/34; 277/59; 356/142; 358/100; 376/203
[58] Field of Search ............... 376/203, 204, 205, 206,
376/240, 245, 248, 258, 260, 262, 353, 463, 449;
277/3, 34, 58, 59, 70, 167.3; 358/100; 356/139,
142, 153

[56] References Cited

U.S. PATENT DOCUMENTS

| | | | |
|---|---|---|---|
| 3,514,115 | 5/1970 | Gallo | 376/206 |
| 3,716,245 | 2/1973 | Turolla | 277/59 |
| 3,717,352 | 2/1973 | Jansing et al. | 376/206 |
| 4,191,471 | 3/1980 | Courten et al. | 356/142 |
| 4,284,475 | 8/1981 | Anthony | 376/353 |
| 4,292,133 | 9/1981 | Sasaki et al. | 376/260 |
| 4,335,883 | 6/1982 | Le Roux et al. | 277/59 |
| 4,432,931 | 2/1984 | Lockett | 376/248 |
| 4,440,339 | 4/1984 | Tamai et al. | 228/119 |
| 4,448,425 | 5/1984 | von Bergen | 277/59 |
| 4,470,946 | 9/1984 | Vassalotti et al. | 376/204 |

Primary Examiner—Charles T. Jordan
Assistant Examiner—Richard L. Klein
Attorney, Agent, or Firm—Antonelli, Terry & Wands

[57] ABSTRACT

A water sealing device suitable for use when a control rod drive housing welded to a stub tube and extends through a wall of a reactor pressure vessel is replaced, singly or with the stub tube, by a new one, including a sealing cylinder temporarily inserted in a control rod guide tube opening for providing a cylindrical space in which the control rod drive housing is located to shut out water in a core from the vicinity of the control rod drive housing. The sealing cylinder has a centering mechanism including a tester support portion located on an inner peripheral surface of the sealing cylinder for supporting an alignment tester for testing the alignment of centering targets mounted on upper and lower end portions of the control rod drive housing, and a tapered centering portion mounted on an outer peripheral surface of the sealing cylinder and brought into contact with a wall of the control rod guide tube opening when the sealing cylindr is temporarily inserted therein, to mount the sealing cylinder concentrically in the control rod guide tube opening through the tapered centering portion. The sealing cylinder also has a multiple seal located at a lower end portion of the sealing cylinder to allow the sealing cylinder to be brought into sealing contact with an inner wall surface of the reactor pressure vessel. Compressed air is introduced into a space in the multiple seal through the sealing cylinder.

10 Claims, 9 Drawing Figures

FIG. I
PRIOR ART

WATER SEALING DEVICE FOR USE IN REPLACING CONTROL ROD DRIVE HOUSING

FIELD OF THE INVENTION

This invention relates to a water sealing device for use in replacing a control rod drive housing (hereinafter CRD housing) which is suitable for use, when an operation is performed for replacing a CRD housing and/or a stub tube of a reactor pressure vessel (hereinafter RPV) of a nuclear power plant while the plant is in operation, in shutting out the water in the RPV from a section of the RPV in which the replacing operation is being performed.

DESCRIPTION OF THE PRIOR ART

Figure 1:
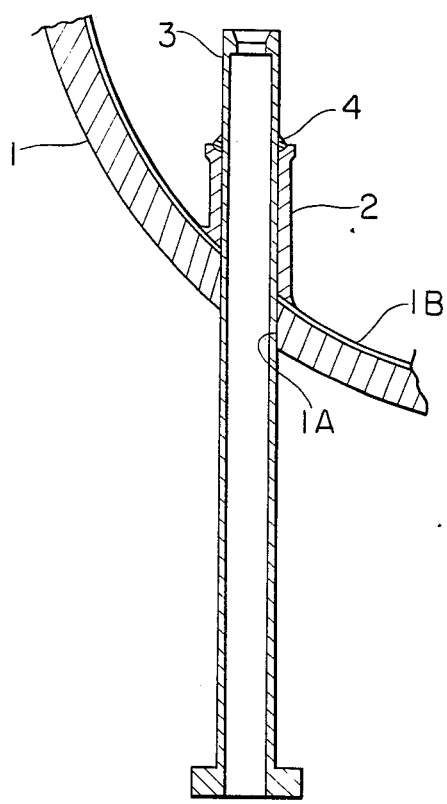
FIG. 1 is a sectional view of the CRD housing in the RPV.

One example of the CRD housing of the RPV of a boiling-water nuclear reactor is shown in FIG. 1. The RPV 1 having a deposited metal layer, such a inconel, formed by overlay welding is formed with an aperture 1A, and a cylindrical stub tube 2 communicating with the aperture 1A is connected to an inner wall surface of the deposited metal layer of the RPV 1. The CRD housing 3 extending through the aperture 1A is joined to the stub tube 2 through a weld 4. In this construction, stress corrosion cracking due to the presence of the carbide of chromium and residual stresses of welding might occur in the vicinity of the weld 4, making it necessary to effect replacements. That is, it would become necessary to remove the weld 4 and replace the CRD housing 3 by a new one.

When a nuclear power plant is in operation, water exists in the RPV 1. Thus, it would be necessary to shut out the water from the vinicity of the CRD housing 3 when it is replaced by a new one. To this end, all the water in the RPV 1 might simply be discharged therefrom. However, this would be laborious and it is considered advisable to shut out the water from the vicinity of the CRD housing 3 while maintaining the water in the RPV 1 at a normal water level. A proposal has been made in U.S. Ser. No. 272,882, now U.S. Pat. No. 4,440,339 to provide a watertight seal to the interior of the CRD housing, for example.

Figure 2:
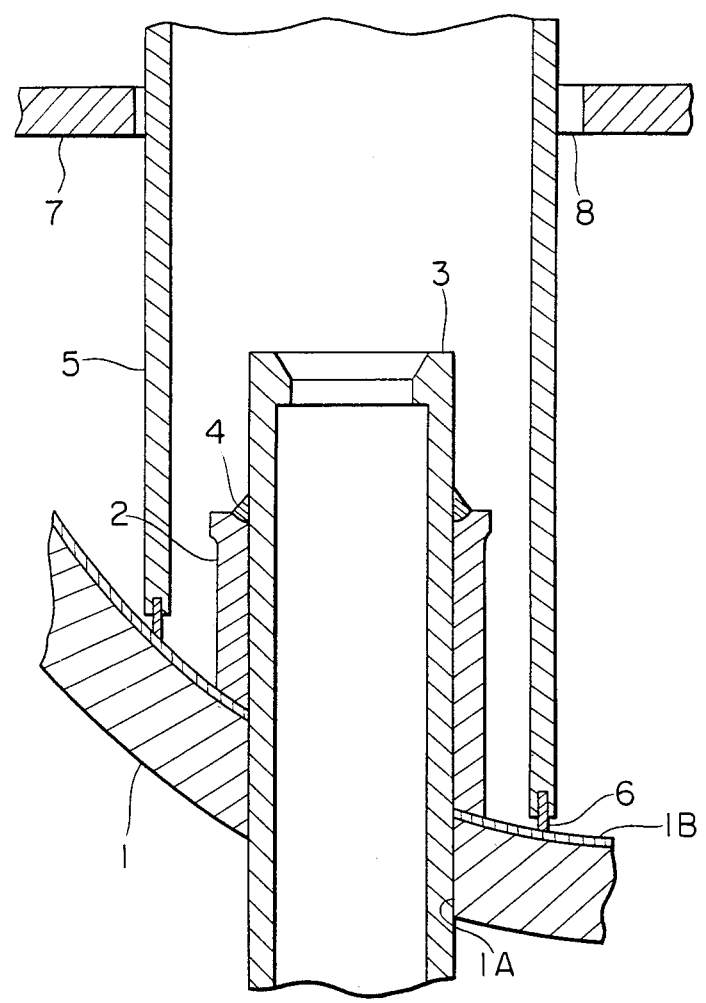
FIG. 2 is a sectional view of a water sealing device of the prior art.

FIG. 2 shows an example of the water sealing device of the prior art for providing a watertight seal to the CRD housing 3 by shutting out the water in the RPV 1 from the vicinity of the CRD housing 3. As shown, the water sealing device comprises a sealing cylinder 5 and a rubber packing 6 inserted in the interior of the RPV 1 in enclosing relation to the CRD housing 3 and the water is removed from the interior of the sealing tube 5. The water in the sealing tube 5 flows out of the RPV 1 through the CRD housing 3, and the water located below the level of the CRD housing 3 in the RPV 1 can be removed readily as by a pump. A core support plate 27 extends horizontally through the RPV 1 and is formed with a control rod inserting aperture 8 which is concentric with the CRD housing 3.

All the control rods should be located vertically, and it is necessary that the CRD housings be also located vertically and secured in place. Moreover, it is necessary that the CRD housing 3 be mounted such that the center of the CRD housing 3 at its upper and lower ends has very severe tolerances with respect to the center of the aperture (hereinafter CRD guide tube opening) 8 formed in the core support plate 7. This is necessary to enable the control rods to be smoothly inserted in the core and withdrawn therefrom to effect control of reactor power and to enable the emergency control rods to be inserted in the core at high speed to scram the reactor when it is necessary to do so.

Thus, when the CRD housing 3 is replaced by a new one, it is necessary that severe tolerances that should be maintained when a new nuclear power plant is built should also be maintained. To this end, it would be necessary to check on the condition in which the new CRD housing 3 is mounted. An alignment test, should be conducted at the same time as the CRD housing 3 is welded to the stub tube 2. Thus, it should be conceivable that the same alignment testing means as is used when a new nuclear power plant is built could be used when the new CRD housing 3 is mounted in place of the old one.

Figure 3A:
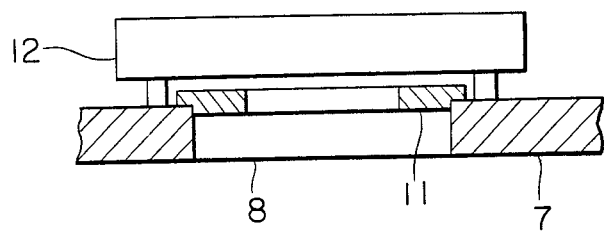
FIG. 3a is a vertical sectional view of the prior art, showing the arrangement of the targets and alignment tester in relation to the core support plate in a new reactor construction.
Figure 3B:
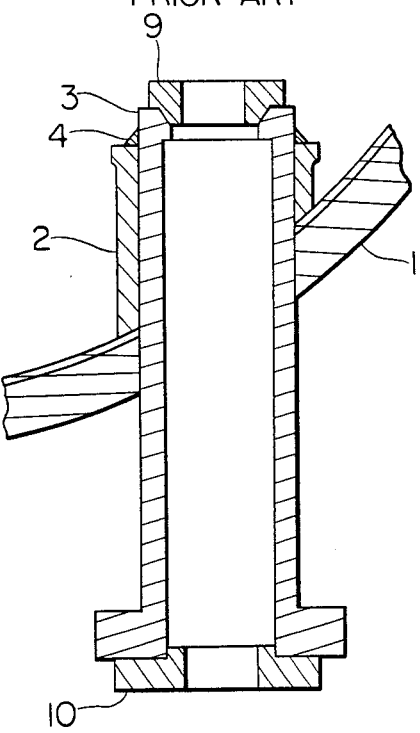
FIG. 3b is a vertical sectional view of the prior art, showing the arrangement of the targets in relation to the CRD housing in a new reactor construction.

The alignment testing method used when the CRD housing is mounted at the time a new nuclear power plant is built will be outlined by referring to FIG. 3. The alignment testing method consists of the following steps;

(1) The CRD housing 3 is tentatively welded to the stub tube 2, and targets 9 and 10 are attached to upper and lower ends of the CRD housing 3 respectively. The targets 9 and 10 are each annular in shape and provided with a crisscross or other mark indicating the center axis.

(2) A target 11 similar to the targets 9 and 10 is fitted to the CR guide tube opening 8 of the core support plate 7, and an alignment tester 12 equipped with optical means is placed on the core support plate 7. The alignment tester 12 is adjusted such that its axis of sight is made vertical as by a level vial.

(3) The alignment tester 12 is brought into focus with the target 11 fitted to the CR guide tube opening 8.

(4) The axis of sight of the alignment tester 12 is brought into alignment with the center indicating mark of the target 11. This brings the axis of sight of the alignment tester 12 into alignment with the center of the CR guide tube opening 8.

(5) The alignment tester 12 is brought into focus with the target 9 at the upper end of the CRD housing 3, to observe the center indicating mark of the target 9 and read the magnitude of a misalignment of the center indicating mark with respect to the axis of sight.

(6) The operation described in paragraph (5) above is also performed with respect to the target 10 at the lower end of the CRD housing 3.

(7) Adjustments of the position of the CRD housing 3 are effected to eliminate the misalignment described above, and then welding is carried out.

When the condition in which the CRD housing 3 is mounted is checked as described hereinabove, the CR guide tube opening 8 serves as a reference.

Referring to the operation of replacing the CRD housing 3 thus mounted by a new one again, the water sealing device is used to shut out water from the vicinity of the CRD housing 3 by providing a watertight seal thereto. In this case, it is impossible to use the CR guide tube opening 8 of the core support plate 7 as the reference for testing the alignment because the sealing tube 5 is inserted in the CR guide tube opening 8 as shown in FIG. 2. Thus, difficulties would be experienced in bringing the center at the upper and lower ends of the CRD housing 3 into alignment with the center of the CR guide tube opening 8 within predetermined tolerances.

Meanwhile, the water sealing device of the prior art would suffer the disadvantage that no satisfactory seal could be provided between a seal 6, such as a rubber packing, and the inner wall surface of the RPV 1 and the water in the RPV 1 might leak into the CRD housing 3. More specifically, a deposited metal layer 1B provided to the inner wall surface of the RPV 1 by overlay welding might be irregular at its surface, and the seal 6 would be unable to accommodate the irregularities of the surface of the deposited metal layer 1B, making it impossible to bring the seal 6 into intimate contact with the surface of the deposited metal layer 1B.

SUMMARY OF THE INVENTION

An object of this invention is to provide a water sealing device suitable for use in replacing the CRD housing and/or the stub tube which is capable of positively and readily performing the operation of replacing the CRD housing and/or the stub tube by new ones while maintaining the water in the reactor core at a normal water level.

To accomplish the aforesaid object, the invention provides a water sealing device comprising a sealing cylinder equipped with centering means which is capable of positively bringing the center of the sealing cylinder into alignment with the center of the CR guide tube opening formed in the core support plate, so that centering of the CRD housing at its upper and lower ends can be effected with the same degree of high precision as achieved when a new nuclear plant is built.

Another object is to provide a water sealing device which is capable of positively shutting out water in the RPV from the vicinity of the CRD housing by providing a watertight seal when the CRD housing is replaced by a new one.

To accomplish the aforesaid object, the invention provides a water sealing device comprising a sealing cylinder equipped with multiple seal means located in a position in which the sealing cylinder is brought into contact with the inner wall surface of the RPV. The multiple seal means enables a watertight seal to be provided between the CRD housing and the inner wall surface of the RPV to positively shut out the water in the RPV from the outer periphery of the CRD housing.

DESCRIPTION OF THE PREFERRED EMBODIMENTS

A preferred embodiment of the water sealing device in conformity with the invention will be described by referring to FIGS. 4-6.

Figure 4:
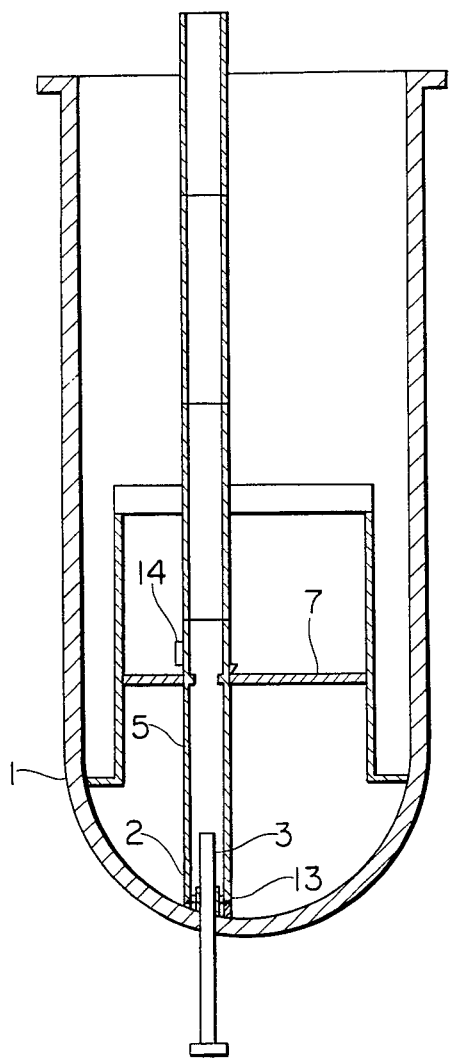
FIG. 4 is a schematic sectional view of the water sealing device comprising one embodiment of the invention, showing the device in its entirety.
Figure 5:
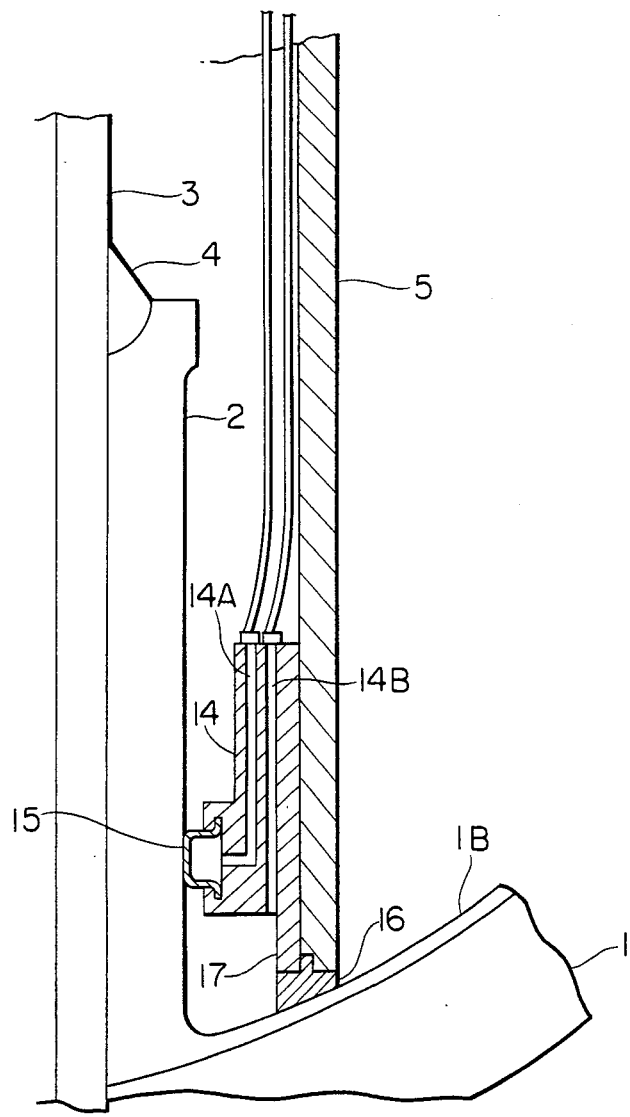
FIG. 5 is a sectional view, on an enlarged scale, of the multiple seal means of the water sealing device shown in FIG. 4.

The water sealing device comprises, as shown in FIGS. 4 and 5, a sealing cylinder 5 having a multiple seal portion 13 including a first sealing member 15 and a second sealing member 16. The first sealing member 15 which is mounted on an inner peripheral surface of the sealing cylinder 5 at its lower end portion through an annular mounting member 14 comprises an annular hollow packing. The second sealing member 16 comprises a rubber packing of cylindrical shape extending downwardly from a lower end of the sealing cylinder 5. The first sealing member 15 is adapted to come into intimate contact with an outer peripheral surface of the stub tube 2. That is, compressed air is supplied from above the sealing cylinder 5 through a first air duct 14A formed in the annular mounting member 14 into the first sealing member 15 which is in the form of an annular hollow rubber packing as described hereinabove, so that the first sealing member 15 is expanded into intimate contact with the outer peripheral surface of the stub tube 2. Compressed air supplied from above the sealing cylinder 5 is also introduced into an air containing pocket 17 located between the first sealing member 15 and second sealing member 16 through a second air duct 14B formed in the annular mounting member 14. The compressed air introduced into the air containing pocket 17 is maintained at a higher pressure level than the water in the RPV 1 to prevent the water flowing into the sealing cylinder 5.

The provision of the sealing cylinder 5 of the aforesaid construction enables the water in the RPV 1 to be positively kept from entering the sealing cylinder 5 by virtue of the presence of the multiple seal portion 13 and the air containing pocket 17 containing compressed air of high pressure, even if the deformed second sealing member 16 is unable to accommodate the irregularities on the surface of the deposited metal layer 1B provided by overlay welding to the inner wall surface of the RPV 1. The entry of the water into the sealing cylinder 5 can be prevented more positively if the compressed air in the air containing pocket 17 is kept at a higher pressure level than the compressed air in the first sealing member 15. Even if the sealing effect achieved by the compressed air in the air containing pocket 17 is slightly reduced by trouble in an air supply circuit or an increase in the gap between the second sealing member 16 and the surface of the deposited metal layer 1B, it is possible to prevent the water entering the sealing cylinder 5 by the sealing effect achieved by the compressed air in the first sealing member 15. Thus, the multiple seal portion 13 enables the sealing effect achieved by the sealing device to be greatly increased and allows the sealing cylinder 5 to cope with any trouble that might happen when watertight seal is provided by the sealing device to the CRD housing 3.

The construction of the tapered centering portion will be described by referring to FIG. 6. The sealing cylinder 5 of the sealing device has fitted over its outer peripheral surface a tapered annular member 18 having a downwardly tapered outer peripheral surface which is connected through a pinion 20 and a rack 19 which has screw inside to a drive motor 21 for vertical sliding movement. Thus, actuation of the drive motor 21 moves the tapered annular member 18 upwardly and downwardly. The center of the tapered annular member 18 with respect to its outer diameter is aligned with the center axis of the sealing cylinder 5. An annular table 22 is mounted on an an inner peripheral surface of the sealing cylinder 5 for supporting a tester for testing the alignment of the center of the CRD housing 3 at its upper and lower end portions with the center axis of the CR guide tube opening 8. The annular table 22 for supporting a tester is constructed in such a mannner that the center thereof with respect to its inner diameter is in alignment with the center of the tapered annular member 18 with respect to its outer diameter. Thus, by actuating the drive motor 21 to move the tapered annular member 18 downwardly into a gap between the outer peripheral surface of the sealing cylinder 5 and a wall surface of the CR guide tube opening 8, it is possible to automaticaly bring the center of the annular table 22 into alignment with the center of the CR guide tube opening 8.

When the tapered annular member 18 is moved into the gap between the outer peripheral surface of the sealing cylinder 5 and the wall surface of the CR guide tube opening 8 to bring the center of the annular table 22 with respect to its inner diameter into alignment with the center of the CR guide tube opening 8 as described hereinabove, the sealing cylinder 5 might be subjected to a lifting action tending to floatingly move it upwardly, and the force with which the sealing cylinder 5 is pressed against the deposited metal layer 1B on the wall surface of the RPV 1 through the second sealing member 16 might be in danger of being reduced. However, the first sealing member 15 in intimate contact with the stub tube 2 is capable of eliminating the influence which might otherwise be exerted by the upward floating movement of the sealing cylinder 5 on the seal provided by the sealing cylinder 5 to the CRD housing 3. Thus, the multiple seal means according to the invention can achieve the effect of positively providing a seal to the CRD housing 3 when the tapered annular member 18 is moved downwardly by the action of the drive motor 21.

Figure 7:
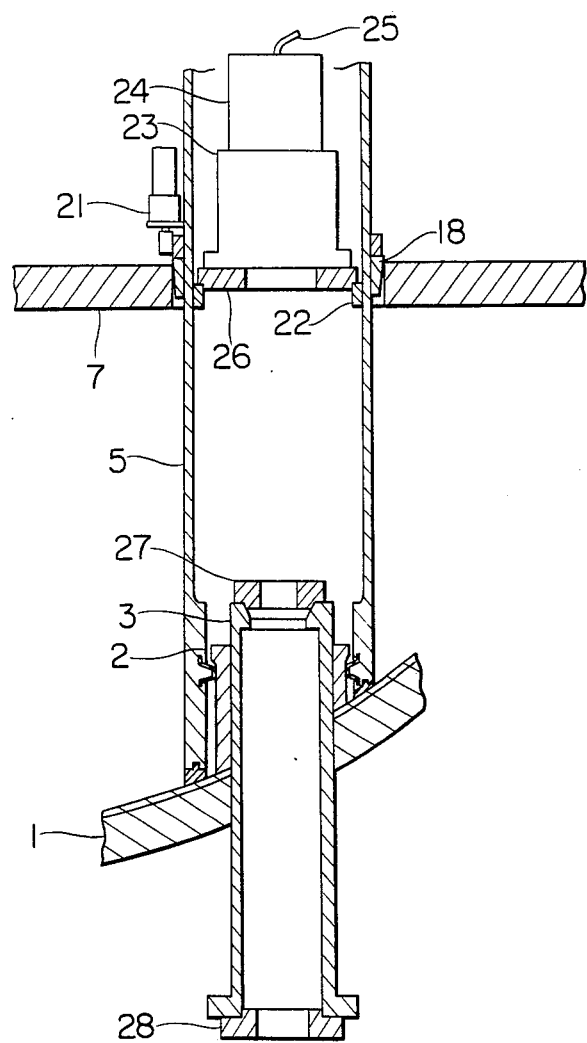
FIG. 7 is a schematic sectional view in explanation of the alignment testing method carried into practice when the water sealing device, which has a multiple seal portion as shown FIG. 5 an in FIG. 4 is used.

Testing of the alignment of the center axis of a new CRD housing mounted by replacing the old one with the center of the CR guide tube opening 8 is conducted as follows after the water in the sealing cylinder 5 is discharged therefrom:

(1) As shown in FIG. 7, targets 26, 27 and 28 are attached to the annular table 22 for supporting a tester, the upper end of the new CRD housing 3 tentatively joined to the wall of the RPV 1 by welding and the lower end of the new CRD housing, respectively. The targets 26, 27 and 28 are constructed such that they can be fitted to the respective openings with a clearance of less than 1/100 mm with respect to their diameters.

(2) An alignment tester 23, such as an alignment scope, is moved downwardly into the RPV 1 and placed on the target 26 fitted to the annular table 22 on the inner peipheral surface of the sealing cylinder 5.

(3) Then, a television camera 24 is placed behind an eyepiece of the alignment tester 23, and an image obtained by the alignment tester 23 is led through a cable 25 to a monitor television installed outside the RPV 1.

(4) The target 27 at the upper end portion of the CRD housing 3 is viewed through the alignment tester 23 to locate the center of the target 27. Then, a deviation of the center from a reference point is obtained.

(5) The operation described in paragraph (4) is also performed with respect to the target 28 at the lower end portion of the CRD housing 3.

(6) When a deviation of any one of the centers of the targets 28 and 29 is obtained, centering of the CRD housing 3 with respect to the CR guide tube opening 8 is carried out by removing the weld and welding the CRD housing again, until perfect alignment of the center axis of the CRD housing 3 with the center of the CR guide tube opening 8 is obtained and the CRD housing 3 is finally joined by welding to the RPV 1.

From the foregoing description, it will be appreciated that the invention enables checking on the condition in which the new CRD housing is mounted to be tested readily and with a high degree of precision, even if the water sealing device remains in a position in which it is fitted over the CRD housing 3 in the RPV 1.

Figure 6:
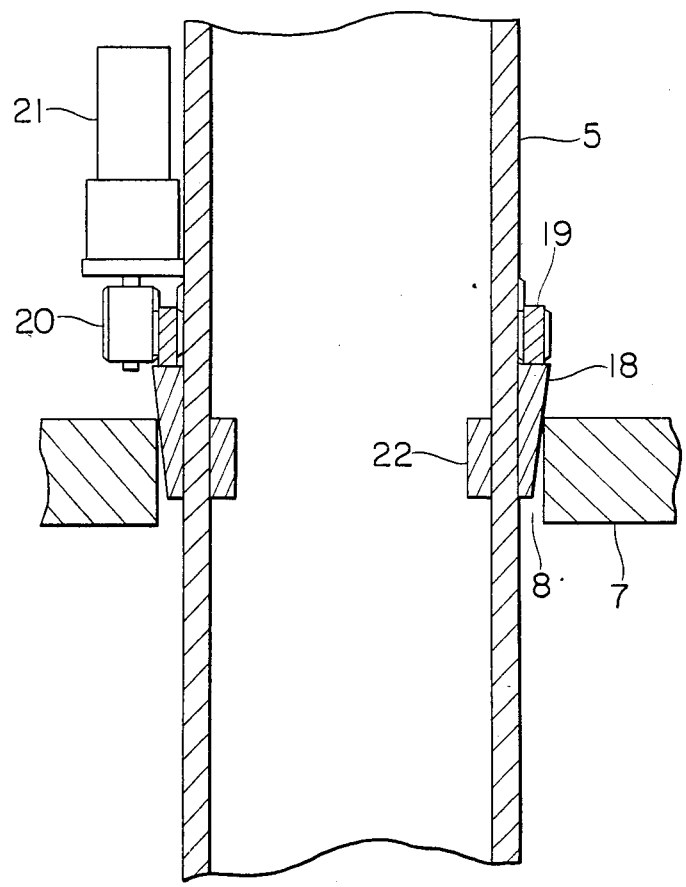
FIG. 6 is a sectional view, on an enlarged scale, of the centering means of the water sealing device shown in FIG. 4.
Figure 8:
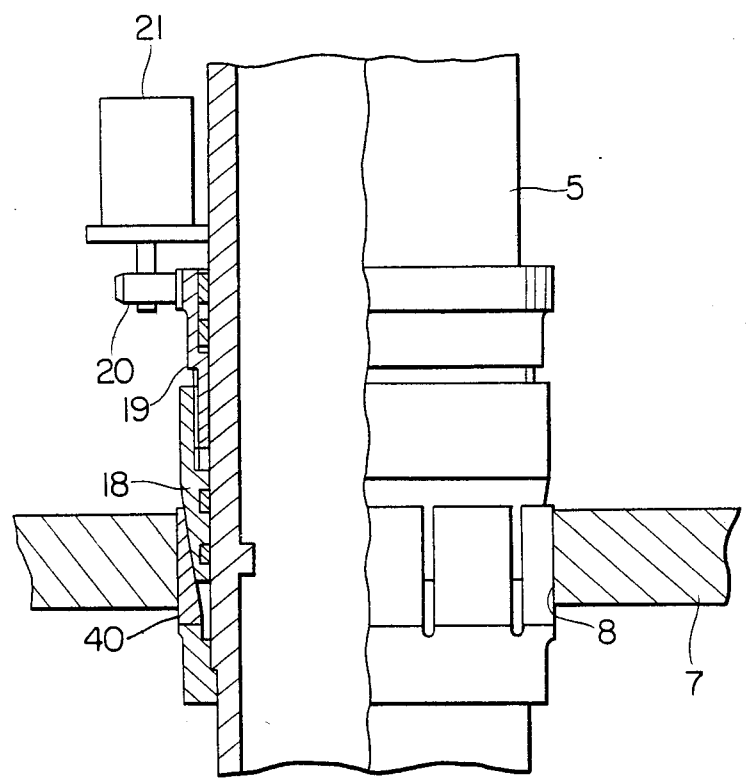
FIG. 8 is a fragmentary sectional view of the water sealing device comprising another embodiment.

In the embodiment shown and described by referring to FIG. 6, the tapered annular member 18 located on the outer peripheral surface of the sealing cylinder 5 is positioned against and in contact with the wall of the CR guide tube opening 8 formed at the core support plate 7. The invention is not limited to this specific manner of mounting the tapered annular member 18. FIG. 8 shows another embodiment in which a collet 40 having its inner peripheral surface an upwardly tapered surface portion complementary with the tapered outer peripheral surface of the tapered annular member 18 is fitted over the tapered annular member 18 and positioned against and in contact at its outer peripheral surface with the wall of the CR guide tube opening 8.

In the aforesaid construction, a clamping force with which the sealing cylinder 5 clamps at its outer peripheral surface against the core support plate 7 through the tapered annular member 18 can be corrected by the engagement of the tapered surface portion of the collet 40 with the tapered surface of the annular member 18, thereby enabling the upwardly directed floating movement of the sealing cylinder 5 to be avoided. Thus, the embodiment shown in FIG. 8 is capable of providing better sealing effects than the embodiment shown in FIG. 6.

What is claimed is:

1. In a reactor pressure vessel including a core, and a control rod drive housing extending through an opening formed in a wall of said reactor pressure vessel and a stub tube comunicating with said opening and welded to the stub tube through a weld, a water sealing device comprising a sealing cylinder temporarily inserted, when said control rod drive housing and/or said stub tube are replaced by new ones by removing said weld, in a control rod guide tube opening formed in a core support plate of the reactor pressure vessel for providing within the reactor pressure vessel a cylindrical space in which said control rod drive housing is located to shut out water in the core from the vicinity of the control rod drive housing, said sealing cylinder comprising:

centering means mounted on inner and outer peripheral surfaces of said sealing cylinder and comprising:
a tester support portion located on the inner peripheral surface of the sealing cylinder for supporting an alignment tester for testing the alignment of centering targets mounted on upper and lower end portions of the control rod drive housing; and a tapered centering portion mounted on the outer peripheral surface of the sealing cylinder and brought into contact with a wall of the control rod guide tube opening when the sealing cylinder is temporarily inserted in the control rod guide tube opening, whereby the sealing cylinder can be concentrically mounted in the control rod guide tube opening through the tapered centering portion.

2. A water sealing device as claimed in claim 1, wherein said tapered centering portion comprises a tapered annular member mounted on the outer peripheral surface of the sealing cylinder for axial sliding movement.

3. A water sealing device as claimed in claim 2, wherein said tapered annular member is in contact with the wall of the control rod guide tube opening through a collet secured to the outer peripheral surface of the sealing cylinder.

4. In a reactor pressure vessel including a core, and a control rod drive housing extending through an opening formed in a wall of said reactor pressure vessel and a stub tube communicating with said opening and welded to the stub tube through a weld, a water sealing device comprising a sealing cylinder temporarily inserted, when said control rod drive housing and/or said stub tube are replaced by new ones by removing said weld, in a control rod guide tube opening formed in a core support plate of the reactor pressure vessel for providing within the reactor pressure vessel a cylindrical space in which said control rod drive housing is located to shut out water in the core from the vicinity of the control rod drive housing, said sealing cylinder comprising:

centering means comprising a tester support portion located on an inner peripheral surface of the sealing cylinder for supporting an alignment tester for testing the alignment of centering targets mounted on upper and lower end portions of the control rod drive housing, and a tapered centering portion mounted on an outer peripheral surface of the sealing cylinder and brought into contact with a wall of the control rod guide tube opening when the sealing cylinder is temporarily inserted in the control rod guide tube opening, whereby the sealing cylinder can be concentrically mounted in the control rod guide tube opening through the tapered centering portion; and multiple seal means located at a lower end portion of said sealing cylinder for enabling the sealing cylinder to be sealed with respect to an inner wall surface of the reactor pressure vessel, said multiple seal means receiving a supply of compressed air through the sealing cylinder.

5. A water sealing device as claimed in claim 4, wherein said tapered centering portion comprises a tapered annular member mounted on the outer peripheral surface of the sealing cylinder for axial sliding movement.

6. A water sealing device as claimed in claim 5, wherein said tapered annular member is in contact with the wall of the control rod guide tube opening through a collet secured to the outer peripheral surface of the sealing cylinder.

7. A water sealing device as claimed in claim 4, wherein said multiple seal means comprises a first sealing member brought into contact with an outer peripheral surface of the stub tube, and a second sealing member brought into contact with the inner wall surface of the reactor pressure vessel, and said compressed air is introduced into a space between said first sealing member and second sealing member.

8. A water sealing device as claimed in claim 7, wherein said first sealing member is formed with a space for introducing the compressed air thereinto.

9. In a reactor pressure vessel including a core, and a control rod drive housing extending through an opening formed in a wall of said reactor pressure vessel and a stub tube communicating with said opening and welded to the stub tube through a weld, a water sealing device comprising a sealing cylinder temporarily inserted, when said control rod drive housing and/or said stub tube are replaced by new ones by removing said weld, in a control rod guide tube opening formed in a core support plate of the reactor pressure vessel for providing within the reactor pressure vessel a cylindrical space in which said control rod drive housing is located to shut out water in the core from the vicinity of the control rod drive housing, said sealing cylinder comprising:

centering means including a tapered centering portion disposed on an outer peripheral surface of the sealing cylinder for being brought into contact with a wall of the control rod guide tube opening so that the sealing cylinder can be concentrically mounted in the control rod guide tube opening through the tapered centering portion, said tapered centering portion being in contact with the wall of the control rod guide tube opening through a collet secured to the outer peripheral surface of the sealing cylinder, and multiple seal means located at a lower end portion of said sealing cylinder for enabling the sealing cylinder to be sealed with respect to an inner wall surface of the reactor pressure, said multiple seal means receiving a supply of compressed air through the sealing cylinder.

10. In a reactor pressure vessel including a core, and a control rod drive housing extending through an opening formed in a wall of said reactor pressure vessel and a stub tube communicating with said opening and welded to the stub tube through a weld, a water sealing device comprising a sealing cylinder temporarily inserted, when said control rod drive housing and/or said stub tube are replaced by new ones by removing said weld, in a control rod guide tube opening formed in a core support plate of the reactor pressure vessel for providing within the reactor pressure vessel a cylindrical space in which said control rod drive housing is located to shut out water in the core from the vicinity of the control rod drive housing, said sealing cylinder comprising:

centering means including a tapered centering portion disposed on an outer peripheral surface of the sealing cylinder for being brought into contact with a wall of the control rod guide tube opening so that the sealing cylinder can be concentrically mounted in the control rod guide tube opening through the tapered centering portion, said centering means further including a tester support portion located on the inner peripheral surface of the sealing cylinder for supporting an alignment tester for testing the alignment for centering targets mounted on upper and lower end portions of the control rod drive housing, and multiple seal means located at a lower end portion of said sealing cylinder for enabling the sealing cylinder to be sealed with respect to an inner wall surface of the reactor pressure, said multiple seal means receiving a supply of compressed air through the sealing cylinder.

* * * * *